United States Patent Office 2,906,726
Patented Sept. 29, 1959

2,906,726
COLOR STABILIZATION OF RESINS WITH ALKALI

William P. Fitz Gerald, Florham Park, and Joseph F. Nelson, Westfield, N.J., assignors to Esso Research and Engineering Company, a corporation of Delaware No Drawing. Application September 28, 1954
Serial No. 458,968

5 Claims. (Cl. 260—45.7)

This invention relates to a resin of improved color and color stability and a method of producing same.

One of the principal objects of this invention is to produce a resin of improved color and to impart color stability to the resin or to concentrated solutions of the resin in hydrocarbon solvents.

Other objects and advantages of the invention will be apparent from the following description and appended claims.

The basic resins used in the present invention are prepared by the polymerization of steam-cracked petroleum fractions boiling in the range of 20 to 280° C. Intermediate fractions boiling within this range, such as the 30–60° or the 30–120° fraction, may also be used advantageously.

In the process generally known as steam cracking, liquid petroleum fractions such as naphtha, kerosene, gas oil, residua, and the like, are cracked at relatively low pressures and at temperatures of 1000 to 1500° F. in the presence of steam and for relatively short contact times. The gas and liquid streams produced contain large quantities of diolefins and olefins, particularly in the $C_5$ to $C_{12}$ range. The naphtha distillate streams obtained by steam cracking operations contain large amounts of diolefins, olefins, aromatics and some paraffins and naphthenes. A typical stream shows 20% diolefins, 51% olefins, 21% aromatics, and 2% paraffins and naphthenes.

In the production of resins these naphtha distillate streams are treated with 0.25–2.5% of a Friedel-Crafts type catalyst such as aluminum chloride, aluminum bromide, boron trifluoride and the like, or solutions, slurries or complexes thereof. The reactions are conducted at temperatures in the range of −50 to +100° C. (preferably −35 to +75° C.). Residual catalyst is quenched by suitable methods such as addition of methyl alcohol and subsequent filtration, water and/or caustic washing and the final solution is then stripped of unreacted hydrocarbons and low molecular weight oils by vacuum and/or steam distillation. The product is a substantially nonaromatic unsaturated hydrocarbon resin, since analysis indicates that little of the aromatic constituents of the feed enters the composition. The color of the resin ranges from light amber to dark brown, depending on the starting materials and other factors. Reference is made to co-pending applications Serial No. 312,466, filed October 1, 1952, Patent No. 2,734,046; Serial No. 312,569, filed October 1, 1952, now abandoned; and Serial No. 318,002, filed October 31, 1952, now abandoned, for details of the preparation of these resins.

It has now been discovered that when these colored petroleum resins are contacted in hydrocarbon solution with an alkaline material such as potassium hydroxide, sodium hydroxide, calcium hydroxide, calcium oxide and the like, the treated resin solution, when removed by filtration, is materially lighter in color. The resin necessarily must be contacted with the alkali in the presence of a solvent. This solvent may be the unreacted constituents in the original feed. In such a case the resin product is treated as it is obtained in the plant prior to stripping. However, if a solvent is added, a suitable example is a low pressure distillate boiling between 30 and 280° C. Such a stream is suitably obtained in the steam-cracking of naphtha or gas oil.

It has also been found that the resin solution may be stored in the presence of the alkali and that when thus stored the final color of the recovered resin is lighter than the same resin stored in the absence of the alkali.

The invention is also applicable to the above mentioned purified resin solution before the unreacted hydrocarbons and low molecular weight oils are removed by stripping. The resin solution can be treated by batch contacting the solution with the alkaline material or the solution can be passed continuously over the solid alkaline material. The treatment can be performed in a plant manufacturing the resin or it can be done later but preferably before long time storage of the resin solution is allowed to take place. However, improvement in color can also be realized by treatment with the alkaline material after long time storage of the resin solution.

The advantages of the invention will be better understood from a consideration of the following experimental data which are given for the sake of illustration, but without intention of limiting the invention thereto.

Example I

Samples of a concentrate or solution consisting of 55 parts by weight of a petroleum resin and 45 parts by weight of low pressure distillate were heated to 105° F. Ten weight percent quantities of sodium hydroxide flakes, calcium hydroxide powder, and calcium oxide powder respectively were added to three concentrate samples and stirred for ten minutes. The concentrates were then filtered and were stored in the presence of clean iron chips for four weeks at 100–110° F.

The low pressure distillate was then steam stripped off the resin and the resin color measured on the Gardner scale. The following values were obtained:

| Sample No. | Treating agent | Initial color | Final color |
|---|---|---|---|
| 1 | NaOH | 10 | 12.5 |
| 2 | Ca(OH)$_2$ | 10 | 12 |
| 3 | CaO | 10 | 12.5 |
| 4 | None | 10 | 13.5–15.5 |

Example II

Two resin concentrates having the same composition as those described in Example I were prepared. To the first sample was added 0.2 weight percent powdered sodium hydroxide. The second sample was not treated. Both samples were stored in the presence of iron chips for six weeks at 100–110° F. At the end of this term of storage the resins were recovered by stripping and the following values for the Gardner color obtained:

Sodium hydroxide inhibited:
    Initial Gardner color _____ 10
    Final Gardner color _____ 14
Uninhibited control:
    Initial Gardner color _____ 10
    Final Gardner color _____ 16

Samples of resin concentrates inhibited with several commercially available antioxidants and stored under identical conditions of time and temperature underwent color degradation equal to that of the control described in this example.

Example III

Resin concentrate was stored for a period of four weeks in a circulating air oven at 100–110° F. and in the presence of iron. At the end of this time the concentrate was divided into two equal portions. The first was isolated from the solvent by steam distillation and the Gardner color determined. The second portion was percolated through a bed of powdered calcium hydroxide and then steam distilled to free the resin of solvent. The Gardner color was obtained for the treated resin and is compared with the untreated control in the following table:

| Sample | Initial color | Final color |
| --- | --- | --- |
| Control | 10 | 12.5-15.5 |
| Treated sample | 10 | 11.5 |

It has been found that between 0.2 and 10 weight percent of the treating agents are effective. A variety of methods of contacting the resin with the alkaline materials can be used. However, the methods described in the example are practical from an industrial standpoint and have been demonstrated as being effective.

The data obtained in the above examples clearly show that treatment of the resin with an alkaline material reduces the color of the resin and further show that storage in the presence of an alkali material will lessen color degradation.

The nature of the present invention having been thus fully set forth and specific examples of the same given, what is claimed as new and useful and desired to be secured by Letters Patent is:

1. A method for maintaining the color stability of a resin in storage in the presence of iron wherein said resin is an unsaturated hydrocarbon resin, prepared by the polymerization of a steam-cracked petroleum distillate in the presence of a Friedel-Crafts catalyst, in solution with a liquid solvent consisting essentially of a hydrocarbon which comprises storing said solution with from 0.2 to 10.0 wt. percent of a powdered solid alkali and leaving said resin with said alkali throughout said storage.

2. A method according to claim 1 wherein the unpolymerized distillate serves as said solvent.

3. A method according to claim 1 wherein said alkali is sodium hydroxide.

4. A method according to claim 1 wherein said alkali is calcium hydroxide.

5. A method according to claim 1 wherein said alkali is calcium oxide.

References Cited in the file of this patent

UNITED STATES PATENTS

| | | |
| --- | --- | --- |
| 1,982,708 | Thomas et al. | Dec. 4, 1934 |
| 2,234,660 | Thomas | Mar. 11, 1941 |

OTHER REFERENCES

Webster's New International Dictionary, 2d ed. (1939), p. 428, "caustic alkali," "caustic ammonia."